J. H. COLLINS.
TOY VEHICLE.
APPLICATION FILED JAN. 24, 1920.
1,365,458.
Patented Jan. 11, 1921.
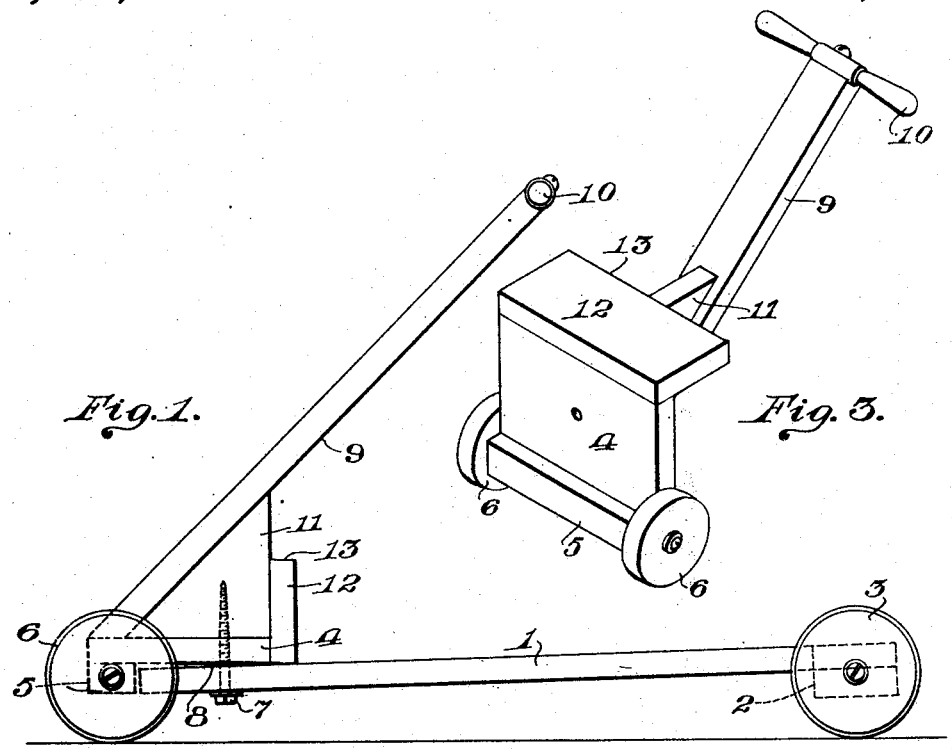
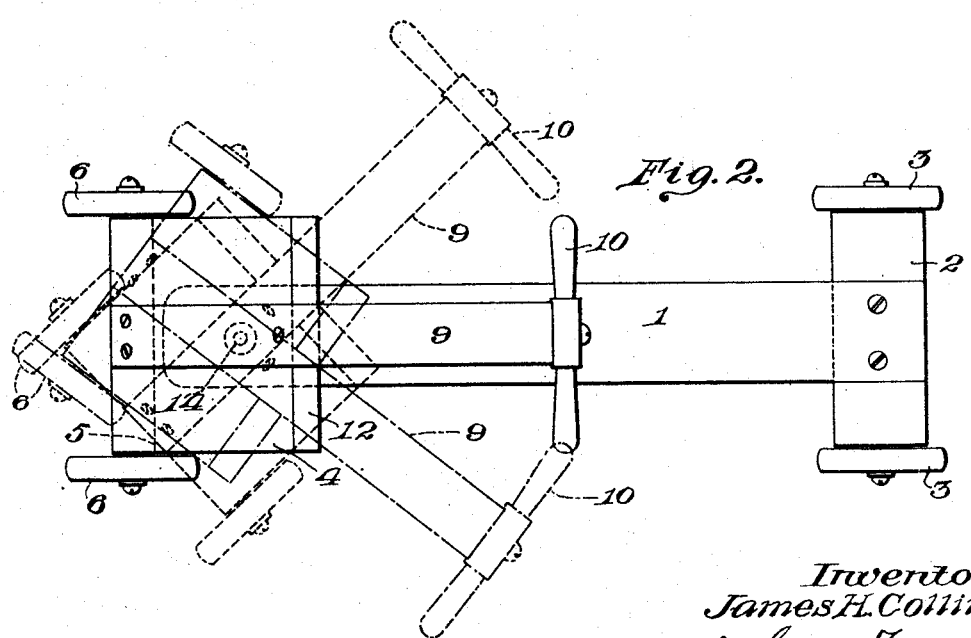
Inventor:
James H. Collins
By J. Stuart Freeman,
Attorney.

UNITED STATES PATENT OFFICE.

JAMES H. COLLINS, OF HARRISBURG, PENNSYLVANIA.

TOY VEHICLE.

1,365,458.  Specification of Letters Patent.  Patented Jan. 11, 1921.

Application filed January 24, 1920. Serial No. 353,658.

*To all whom it may concern:*

Be it known that I, JAMES H. COLLINS, a citizen of the United States, residing at Harrisburg, in the county of Dauphin and State of Pennsylvania, have invented certain new and useful Improvements in Toy Vehicles, of which the following is a specification.

The object of this invention is to provide a toy vehicle, particularly adapted for the use of small children, and that class which have quite commonly come to be known as skatemobiles.

Another object is to provide more particularly a foot-rest supported by one or more wheels at the rear end portion thereof, a forward member which is preferably positioned horizontally and supported at its forwardmost portion by means of one or more wheels, pivotal means connecting the foot-rest to said forward member at a point considerably removed to the rear of the forward wheels, or to the rear of a line extending between said wheels, a steering member secured to said forward member preferably at the front end of the latter, and extending upwardly and diagonally rearwardly to form at its free end a handle and rest for the person operating the vehicle, said steering member being preferably secured rigidly to said forward member and extending well to the rear of a vertical line through the said pivotal connection.

This construction is designed for the purpose of providing a movement of the free end of the steering member either toward the right side of the vehicle which will shift the forward wheel or wheels toward the opposite side of the vehicle, or, looking at it in another light, if all of the supporting wheels arm firmly engaging the ground, a movement of the steering member to the right-hand side, for instance, will shift the pivotal connection toward the same side of a central line drawn between the forward and rear supporting wheels, this arrangement having the advantage of transversely shifting the support, upon which the major portion of the rider's weight rests, in the same direction as the movement of his hands in guiding the vehicle, and to a certain degree the rear wheels by this construction tend to follow more nearly in the path of the forward wheels than they would if the pivotal connection were located as in most instances substancially in the vertical plane of the common axes of the forward wheels.

A further object of the invention is to provide a vehicle comprising two sections, the forward of which can be removed from the rear of said sections and inverted as shown in position to form what might be called a two-wheeled wheel-barrow or cart, upon which a child could carry light articles or dolls.

Fith these and other objects in view, the invention comprises additional details of construction and operation hereinafter clearly brought out in the following description, when read in conjunction with the accompanying drawings, in which Figure 1 is a side elevation of the preferred embodiment of the invention; Fig. 2 is a top plan view of the same showing the two positions of the forward steering wheels and operating mechanism therefor in dotted lines; and Fig. 3 is a perspective view of the forward portion of the device separated from the other portion and inverted to form a push-cart or the like.

Referring to the drawings, there is provided a longitudinally extending, substantially horizontal board 1, which we will term a foot-rest, and which at its rear end has suitably secured thereto a transversely extending member 2, to the laterally opposite end portions of which are revolubly secured also in any suitable manner supporting wheels 3. A forward transversely extending and substantially horizontal member 4 is provided, which member is preferably of greater width than the foot-rest and of substantially the same width as the rear member 2. Said last-named member is reinforced at its forward end by a transversely extending member 5, to the laterally opposite end portions of which are rotatably mounted suitable supporting wheels 6, though this invention is intended to anticipate the application of the principles thereof to a vehicle comprising only a single rear and a single forward wheel, as might be desired.

Near the forward portion of the foot-rest 1 a suitable lag-screw 7, or the equivalent, is made to extend upwardly into and through the forward member 4, in order to pivotally connect said last-mentioned member to said foot-rest, so that the point of pivotal connection is considerably removed to the rear of the wheels 6 or their common axes, while a washer 8 is preferably provided between the member 4 and foot-rest in order to prevent the lag-screw from exerting a binding frictional engagement between the two coöperating members.

A steering member 9 is provided, the same comprising a lever preferably secured to the forward member 4 at the front edge portion thereof, and extending obliquely upwardly and rearwardly to a position considerably to the rear of a vertical line passing through the pivotal connection established by said lag-screw, and said steering member carrying upon its upper free end suitable oppositely extending handles 10, adapted to operate as a rest for steadying the child operating the vehicle, and carry a portion of its weight, as well as affording a convenient grip of the child upon the said steering member.

This means of steering might be pivotally connected to the member 4 in order to move in a vertical plane, but it must be restrained against lateral movement with respect to said forward member. In the preferred construction, however, this member is rigidly supported by means of a brace 11, which extends from the central portion of the member 4 upwardly to and engages the central under portion 9, while said brace is in turn reinforced and prevented from becoming loosened transversely by means of a suitable brace 12 secured to the rear portion of the said forward member and also to the said first-named brace, and when made to comprise an upper horizontal edge portion 13 it represents a rest for the foot of the child-operator when it is not desired to place both feet upon the foot-rest 1.

Furthermore, as is obvious from Fig. 3, the forward steering portion of the vehicle may be removed from pivotal connection with said foot-rest, and inverted so that the second brace 12 forms a rest for dolls or other toys, or a platform upon which light articles may be carried, in which case the members 4 and 11 serve as a support for the platform brace 12, and are supported by the wheels 6 and steadied as in the case of a push-cart or wheel-barrow by means of the member 9 and handles 10.

As is evident from Fig. 2, a movement of the handles and steering member toward the right of the foot-rest effects a movement of the steering wheels toward the left thereof, and vice versa. Or, if the vehicle is considered as resting with all of its wheels in engagement with the ground or other supporting surface, a movement of the handles toward the right effects a shifting of the pivotal connection 14 in the same direction, or, in other words, toward the same side of a line drawn between points upon the common axes of the forward and rear wheels respectively mid-way between the wheels of each pair.

Having thus described my invention, what I claim and desire to protect by Letters Patent of the United States is:—

1. In a toy vehicle, a longitudinal board, a rear axle member secured to the rear end of the longitudinal board, wheels carried by the ends of the rear axle member, a forward steering member arranged above the forward end of the longitudinal board and extending laterally beyond the same for a substantial distance, an axle member secured to the forward end of the steering member, wheels carried by the last named axle member, a substantially triangular brace arranged upon and rigidly secured to the upper surface of the steering member, a tongue engaging the inclined face of the substantially triangular brace and rigidly secured to the brace, and a pivot element connecting the rear portion of the steering member and the forward end of the longitudinal board.

2. In a toy vehicle, a longitudinal board, a rear axle member secured to the rear end of the longitudinal board, wheels carried by the ends of the rear axle member, a forward steering member arranged above the forward end of the longitudinal board and extending laterally upon both sides beyond the same for a substantial distance, an axle member secured to the forward portion of the steering member, wheels carried by the ends of the last named axle member, a substantially triangular brace arranged upon and rigidly secured to the upper surface of the steering member, a tongue engaging the inclined face of the substantially triangular brace and rigidly secured to the brace, a transverse brace engaging the rear ends of the transverse steering member and substantially triangular brace, and terminating near the ends of the steering member, said transverse brace being adapted to contact with the longitudinal board, and a pivot element connecting the steering member and the forward end of the longitudinal board.

3. In a toy vehicle, a longitudinal extending board, a rear axle member secured to the said board, wheels carried by the said axle member, a forward steering member arranged above the adjacent end of the longitudinal board and extending laterally beyond the same for a substantial distance, an axle member secured to the forward end portion of the steering member, a wheel carried by the last-named axle member, an angular brace arranged upon and rigidly secured to the upper surface of the steering member, a tongue rigidly secured to and extending from the said brace and inclined with respect to the said longitudinal board, and a pivot element connecting the rear portion of the steering member and the forward end portion of the longitudinal board.

4. In a toy vehicle, a longitudinal board, a rear axle member secured to the said board, wheels carried by the said axle member, a forward steering member arranged above the adjacent end of the longitudinal board and extending laterally upon both sides beyond the same for a substantial distance, an axle member secured to the forward portion of the steering member, wheels carried by the ends of the last-named axle members, a brace arranged upon and rigidly secured to the upper surface of the steering member, a tongue rigidly secured and extending from said brace and inclined with respect to the said longitudinal board, a transverse brace engaging the rear portion of the transverse steering member and the adjacent portion of the said brace, said transverse brace normally contacting with the longitudinal board, and a pivot element connecting the steering member and the forward end portion of the longitudinal board.

In testimony whereof I have affixed my signature.

JAMES H. COLLINS.